US007406067B2

United States Patent
Deng et al.

(10) Patent No.: US 7,406,067 B2
(45) Date of Patent: Jul. 29, 2008

(54) STRUCTURE OF A MULTI-INPUT MULTI-OUTPUT MULTICARRIER CODE DIVISION MULTIPLE ACCESS COMMUNICATION SYSTEM AND COMMUNICATION METHOD THEREOF

(75) Inventors: Juinn-Horng Deng, Pingjhen (TW); Jwo-Yuh Wu, Hsinchu (TW); Ta-Sung Lee, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 757 days.

(21) Appl. No.: 10/829,261

(22) Filed: Apr. 22, 2004

(65) Prior Publication Data

US 2005/0174932 A1    Aug. 11, 2005

(30) Foreign Application Priority Data

Feb. 6, 2004   (TW) .............................. 93102855 A

(51) Int. Cl.
 *H04B 7/216* (2006.01)
(52) U.S. Cl. ..................................... 370/335
(58) Field of Classification Search ................ 370/203, 370/204, 208, 209, 210, 211, 278, 282, 310, 370/320, 329, 335, 336, 341, 342, 431, 441, 370/532, 533, 534, 535, 536, 537, 539, 541, 370/542
 See application file for complete search history.

(56) References Cited

U.S. PATENT DOCUMENTS 7,362,794 B2 * 4/2008 Ma ............................ 375/148

2003/0007190 A1 * 1/2003 Kaku et al. ............ 358/426.09

OTHER PUBLICATIONS

Helmut Bolcskei and Arogyaswami J. Paulraj, Multiple-Input Multiple-Output (MIMO) Wireless System, Chapter in "The Communications Handbook", 2nd edition, J. Gibson, ed., CRC Press, pp. 90.1-90.14, 2002.*
Howard Huang, Harish Viswanathan, and G. J. Foschini, Achieving High Data Rates in CDMA Systems Using BLAST Techniques, 1999. Globecom '99, Global Telecommunications Conference, vol. 5, pp. 2316-2320.*
R. Doostnejad, Joon Lim Teng, and E. S. Sousa, Space-time spreading codes for a multiuser MIMO system, Signals, Systems and Computers, 2002. Conference Record of the Thirty-Sixth Asilomar Conference on vol. 2, Nov. 3-6, 2002 pp. 1374-1378.*
Ezio Biglieri, Coding for the Wireless Channel, 2003, CRC Press LLC, Handbook of Ad hoc Wireless Networks (The).*
Helmut Bölcskei and Arogyaswami J. Paulraj, Multiple-Input Multiple-Output (MIMO) Wireless Systems, 2002,CRC Press LLC, pp. 1-2, 6 and 8-10.*

* cited by examiner

*Primary Examiner*—Chirag G Shah
*Assistant Examiner*—Ashley L Shivers
(74) *Attorney, Agent, or Firm*—Rosenberg, Klein & Lee

(57) ABSTRACT

The present invention discloses a MIMO system and method, which is suitable for MC-CDMA communication system with multiple paths to obtain the spectrum efficiency and gain simultaneously. The transceiver performs steps of simultaneously transferring transmitting data to a plurality of parallel data streams, and space time block encoding each data, followed by spreading the encoded data streams with a pre-designed space-path spreading code, and transmitting data with the transmit antennas through multiple paths. Finally, at each receiver, despreading received data by the matched filters, and separating mutually interfering signals with a linear combiner and a BLAST detector to obtain the diversity gain.

16 Claims, 4 Drawing Sheets

STRUCTURE OF A MULTI-INPUT MULTI-OUTPUT MULTICARRIER CODE DIVISION MULTIPLE ACCESS COMMUNICATION SYSTEM AND COMMUNICATION METHOD THEREOF

BACKGROUND OF INVENTION

1. Field of the Invention

The invention relates to a structure of a multi-input multi-output multicarrier code division multiple access (MIMO MC-CDMA) communication system and a communication method thereof, and more particularly, to a structure of a MIMO MC-CDMA communication system and a communication method using the space time block encoding technology and the space-path spreading codes.

2. Description of the Prior Art

Application of the network and communication system is changed from transferring text and audio data to transferring multimedia data, so the requirement of wireless bandwidth is getting more imperative. The multicarrier code division multiple access (MC-CDMA) communication system is a method to apply the spreading technology onto the OFDM structure. The MC-CDMA allows the spreading code to be independently modified on the carrier wave by the user to decline and flatten the channel, and provides the benefit of various frequencies against interference by using the first-order equalizer.

In the field of the wireless communication system, one of the most important topics is how to eliminate the decay and interference of signals, and a multi-input multi-output (MIMO) technology is disclosed recently. Pluralities of antennas are installed at both terminals of the wireless transmission, so the spectrum efficiency and transmission reliability can be obviously improved, and the diversity gain can be provided. In 1998, the BLAST (Bell Laboratories layered space-time) technology which is a structure of MIMO was disclosed by Foschini et al. (Wireless Personal Commun., vol. 6, pg.315-335). The spatial multiplexing function in the point-to-point narrow-band communication can be achieved with this technology without increasing transmitting power and system bandwidth. The spatial multiplexing function can transmit different data streams at pluralities of antennas simultaneously with the independent and parallel spatial channels, and get more effective spectrum of the communication system.

On the other hand, for improving the chain quality of the MIMO communication system, the transmit diversity and the receive diversity can be selected to obtain a flattened environment. For example, the space-time coding (STC) technology is a popular one used in the MIMO communication system. However, the spectrum efficiency and diversity cannot be simultaneously optimized, and can only choose one. For solving this problem, the multi-code transmission technology is developed, such as the space-time spreading BLAST (STS BLAST) technology. The technology disclosed by Huang et al. in the IEEE journal is one kind of the multi-code transmission technology (*IEEE Trans. Wireless Commun.*, 2002 vol. 1, no. 3, pg. 383-392). However, when comparing with the method that only uses the BLAST technology or the space-time block coding (STBC) technology, the multi-code transmission technology can only get the lower spectrum efficiency and diversity gain. When applying to the wide-band system, or named the multiple path environment, the multi-code transmission efficiency will be lowered by the Intersymbol Interference (ISI) and the non-perpendicular substreams, and the conventional technologies cannot have a better diversity or spectrum efficiency.

SUMMARY OF INVENTION

It is therefore a primary objective of the claimed invention to provide a multi-input multi-output multicarrier code division multiple access (MIMO MC-CDMA) communication system and a communication method thereof to provide a great spectrum efficiency and chain quality.

It is therefore another objective of the claimed invention to provide a MIMO MC-CDMA communication system that can accomplish great spectrum efficiency and chain quality simultaneously.

It is therefore a further objective of the claimed invention to provide a MIMO MC-CDMA communication system and a communication method thereof using the space time block encoding technology and the space-path spreading codes to obtain a great spectrum efficiency and chain quality.

According to the claimed invention, a structure of a MIMO MC-CDMA communication system is disclosed. The transmitter comprises: a de-multiplexer for receiving a user's data and outputting the data divided into a plurality of parallel data streams; a plurality of space time block encoders individually receiving the parallel data streams of the de-multiplexer and outputting the data streams after encoding; a plurality of space-path spreaders receiving outputted data from the space time block encoders and outputting received data after spreading with a pre-designed space-path spreading code; and a plurality of transmit antennas, each transmit antenna receives outputted data from each space-path spreader and transmits received data through multiple paths.

The present invention also discloses a receiver applied on the above-mentioned MIMO MC-CDMA communication system. The receiver comprises: a plurality of receive antennas for receiving data transmitted by the transmit antennas; a plurality of matched filters individually receiving data received by the receive antennas and despreading it in accordance with the space-path spreading code; a space-time linear combiner receiving data dispread by the matched filters and outputting received data after combining; a BLAST detector receiving data outputted by the space-time linear combiner, separating mutually interfering signals from the multiple transmit antennas, obtaining diversity gain, and outputting operated data; and a multiplexer receiving data from the BLAST detector and outputting data after multiplexing.

The present invention further discloses a MIMO MC-CDMA communication method. The step of transmitting data comprises: simultaneously transferring transmitting data into a plurality of parallel data streams; space time block encoding each parallel data stream; spreading the encoded data streams with a pre-designed space-path spreading code; and collecting the spread parallel data streams, transferring to a plurality of transmit antennas, and transmitting data with the transmit antennas through multiple paths.

The step of receiving data of the MIMO MC-CDMA communication method comprises: receiving data transmitted by the transmit antennas through a plurality of receive antennas; despreading data received by the receive antennas through a plurality of corresponding matched filters in accordance with the pre-designed space-path spreading code; combining the dispread data with a linear combiner; and separating mutually interfering signals from the combined data with a BLAST detector, and outputting data after multiplexing it with a multiplexer.

These and other objectives of the present invention will no doubt become obvious to those of ordinary skill in the art after reading the following detailed description of the preferred embodiment that is illustrated in the various figures and drawings.

Figure 1A:
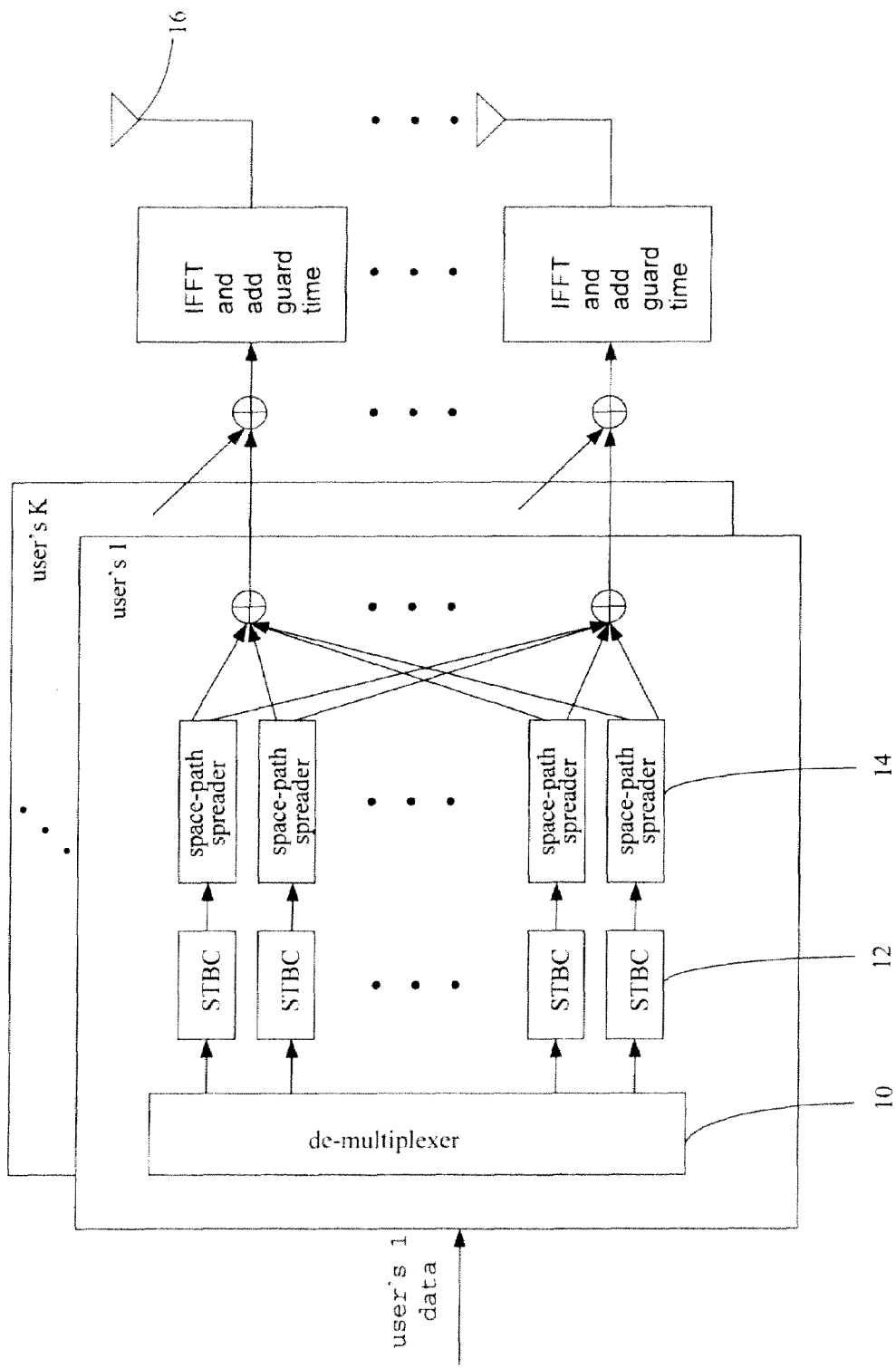
FIG. 1(a) is a schematic diagram of a transmitter of a MC-CDMA system according to the present invention.

10 de-multiplexer
12 space time block encoder
14 space-path spreader
16 transmit antenna
18 receive antenna
20 matched filter
22 space-time linear combiner
24 BLAST detector
26 multiplexer

DETAILED DESCRIPTION

Figure 1B:
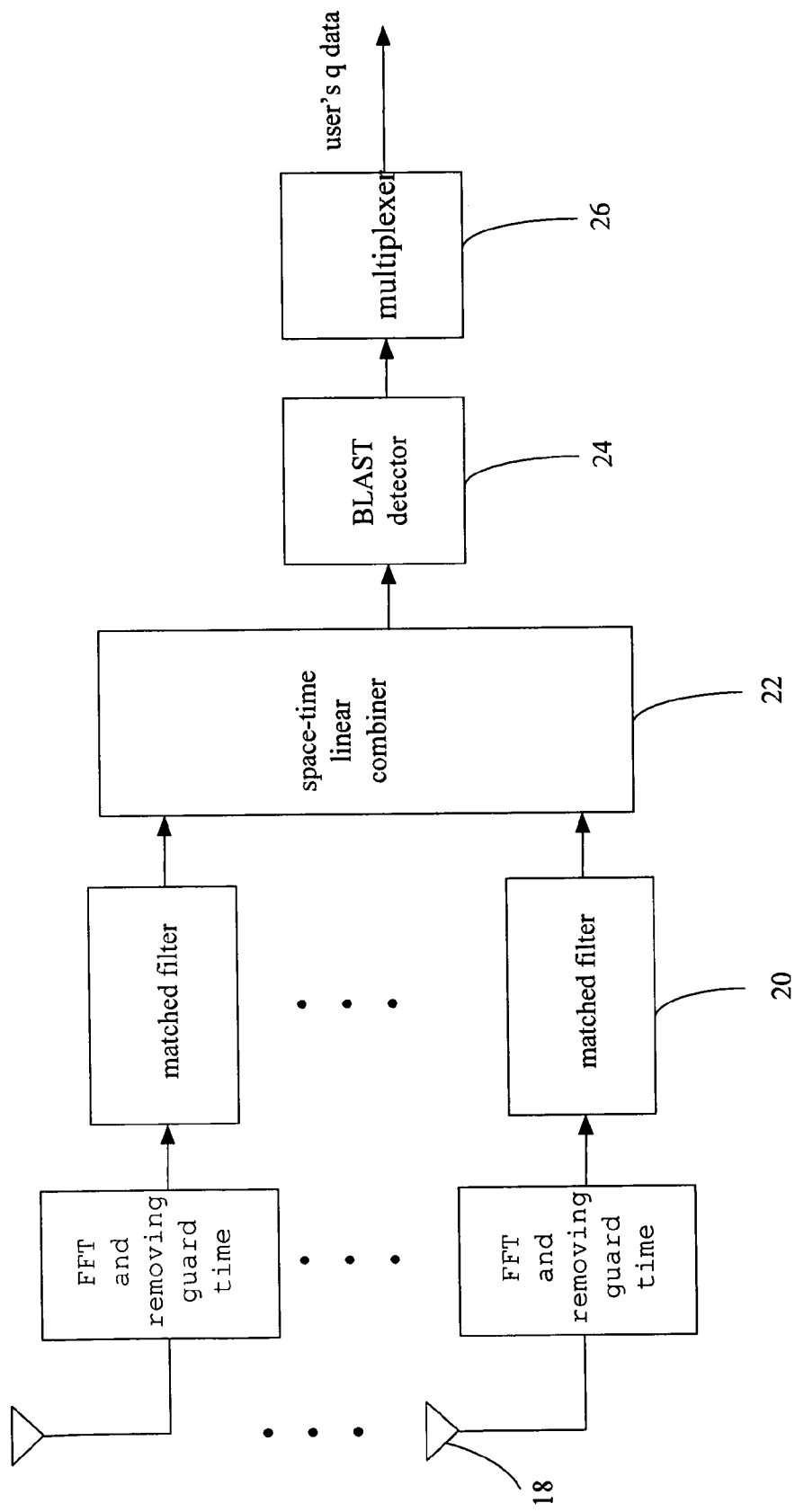
FIG. 1(b) is a schematic diagram of a receiver of a MC-CDMA system according to the present invention.

The claimed structure of a MIMO MC-CDMA communication system is shown in FIGS. 1(a) and 1(b). FIG. 1(a) is a schematic diagram of a transmitter of this system, FIG. 1(b) is a schematic diagram of a receiver of this system, and this structure is constructed on the multiple paths of frequency setting. The transmitter of the base station has $N_t$ transmit antenna 16 providing K users to transmit data simultaneously. As shown in FIG. 1(a), the data streams of each user are processed by a de-multiplexer 10 to produce $LN_t$ substreams, and the substreams can be divided into L groups of parallel data streams with $N_t$ symbols and outputted from the de-multiplexer 10. The data streams of users can be shown as $d_k(i)$, wherein k=1,2, . . . ,K means K users. After processing by the de-multiplexer 10, the substreams can be shown as $$d_{k,p}^{(n_t)}(i) = d_k(N_t(i+p-1)+n_t-1),$$

wherein $n_t=1,2,\ldots,N_t$, $p=1,2,\ldots,L$, and L is the path length (the unit is chip). The L groups of parallel data streams output by the de-multiplexer are space-time block coded with the L space time block coders (STBC) 12, and in the coded L data streams, the symbol of each data stream has the same space time block coding structure. That means that the symbols with the same $N_t$ are related complex conjugation multiplying a minus sign. The space time block coding technology can provide various space to diversify and obtain better chain quality.

Then, the coded parallel data streams are individually passed through the space-path spreader 14. The data streams are spread with the pre-designed space-path spreading codes $t_{k,p}$ to anticipatively suppress the multiple access interference (MAI) and anticipatively equalize the multiple paths. After spreading, the $n_{t\,th}$ data stream of each group of the substreams are added and transmitted to the $n_{t\,th}$ antenna. The transmission signal on the $N_t$ transmit antenna is $s(t)=[s^{(1)}(t), s^{(2)}(t),\ldots,s^{(N_t)}(t)]^T$, wherein $$s^{(n_t)}(t) = \sum_{k=1}^{K} s_{k,i}^{(n_t)}(t).$$

In the MC-CDMA system, the transmission signal $$s_{k,i}^{(n_t)}(t)$$

of the $i_{th}$ data symbol transmitted by the $k_{th}$ user through the $n_{t\,th}$ transmit antenna 16 can be shown as:

$$s_{k,i}^{(n_t)}(t) = \sum_{m=0}^{M-1}\sum_{p=1}^{L} t_{k,p}(m) d_{k,p}^{(n_t)}(i) \exp\left\{j2\pi m \frac{t}{T_b}\right\} \quad (1)$$

wherein, $t\in[iT_b,(i+1)T_b]$, $T_b$ is symbol interval, $t_{k,p}(m)$ is the $$(m+1)_{th} t_{k,p},\ d_{k,p}^{(n_t)}(i)$$

is $i_{th}$ data symbol with the average zero and the variation $P_T/N_t$, $P_T$ is the total transmission energy average. The transmission path has L separated Rayleigh decay path (L<<M), and for simplifying the analysis, if the path delay spread interval of all users are the same, a guard time $T_G$ can be inserted before transmitting $$s_{k,i}^{(n_t)}(t)$$

to reduce the interference between symbols.

For receiving the signals transmitted by the transmit antenna 16, assuming user q is the matched user, the signals received by the $m_{r\,th}$ receive antenna 18 of the $q_{th}$ mobile station can be shown as:

$$\bar{x}_q^{(m_r)}(t) = \sum_{k=1}^{K}\sum_{n_t=1}^{N_t}\sum_{l=1}^{L}\sum_{i=-\infty}^{\infty} \alpha_{q,l}^{(m_r,n_t)} s_{k,i}^{(n_t)}(t-i(T_b+T_G)-\tau_{q,l}T_c) + \bar{n}_q^{(m_r)}(t) \quad (2)$$

Wherein $$\alpha_{q,l}^{(m_r,n_t)}$$

is the decay gain of the $l_{th}$ path, $\tau_{q,l}$ is the delay time of the $n_{t\,th}$ transmit antenna 16 of the base station to the $m_{r\,th}$ receive antenna 18 of the $q_{th}$ mobile station, $$\alpha_{q,l}^{(m_r,n_t)}$$

is the stable complex Gaussian assuming average zero, $T_c=T_b/M$ is the chips interval, and $\bar{n}_q^{(m_r)}(t)$ is the additional white gauss noise with energy $\sigma_n^2$.

After removing the guard time of the received signals, when sampling the $i_{th}$ symbol interval at time $t=iT_b+nT_c$, the produced digital receive data is:

$$\bar{x}_{q,i}^{(m_r)}(n) = \sum_{k=1}^{K}\sum_{n_t=1}^{N_t}\sum_{l=1}^{L} \alpha_{q,l}^{(m_r,n_t)} s_{k,i}^{(n_t)}(n-\tau_{q,l}) + \bar{n}_{q,i}^{(m_r)}(n) \quad (3)$$

Wherein n=0,1, . . . ,M−1. After the FFT, the receive data in frequency domain is:

$$x_{q,i}^{(m_r)}(m) = FFT\{\bar{x}_{q,i}^{(m_r)}(n)\} \quad (4)$$

$$= \sum_{k=1}^{K}\sum_{n_t=1}^{N_t}\sum_{p=1}^{L}\sum_{l=1}^{L} \alpha_{q,l}^{(m_r,n_t)} d_{k,p}^{(n_t)}(i) t_{k,p}(m)$$

$$\exp\left\{-j\left(2\pi\frac{m}{M}\tau_{q,l}\right)\right\} + n_{q,i}^{(m_r)}(m)$$

wherein m=0,1, . . . ,M−1, and $$n_{q,i}^{(m_r)}(m)$$

is the FFT of $$\bar{n}_{q,i}^{(m_r)}(n).$$

For the received data, the $i_{th}$ symbol data in frequency domain shown in M×1 vector is:

$$x_q^{(m_r)}(i) = [x_{q,i}^{(m_r)}(0), x_{q,i}^{(m_r)}(1), \ldots, x_{q,i}^{(m_r)}(M-1)]^T \quad (5)$$

$$= \sum_{k=1}^{K}\sum_{n_t=1}^{N_t}\sum_{p=1}^{L}\sum_{l=1}^{L} \alpha_{q,l}^{(m_r,n_t)} d_{k,p}^{(n_t)}(i)\{w_{q,l} \odot t_{k,p}\} + n_q^{(m_r)}(i)$$

wherein, $\odot$ denotes the Hadamard product, $t_{k,p}=[t_{k,p}(0),t_{k,p}(1), \ldots ,t_{k,p}(M-1)]^T$, $n_q^{(m_r)}(i)$ is the noise vector, T is the transposed vector, and $w_{q,l}$ is the phase shift vector caused by $\tau_{q,l}$ th the $l_{th}$ path, whose form is:

$$w_{q,l} = \left[1, e^{-j2\pi\tau_{q,l}\frac{1}{M}}, \ldots, e^{-j2\pi\tau_{q,l}\frac{(M-1)}{M}}\right]^T \quad (6)$$

At the receiver, the detection of symbols can be achieved by using the matched filter 20, the space-time linear combiner 22, and the BLAST detector 24, and outputted by the multiplexer 26. Please refer to FIG. 1(b), after the receive antenna 18 of the mobile station receives the data signals from the transmitter, the guard time of the received data is removed in advance if the received data has been added to the guard time or processed with the inverse fast Fourier transform (IFFT), and reversing the data to the frequency domain with FFT. The transmitter utilizes the space-path spreading codes to suppress the multiple access interference (MAI) and equalize the paths, so the receiver only needs a simple matched filter 20 to dispread data. The data received by groups of the receive antennas 18 of the receiver is dispread by groups of matched filters, and these filters have the space-path spreading codes corresponding to the receiver. The matched filter 20 of the $q_{th}$ mobile station can be shown in $c_q$ with length M, and the outputting data of the $m_{r\,th}$ receive antenna 18 of the matched filters 20 corresponding to the mobile station can be shown as:

$$y_q^{(m_r)}(i) = c_q^H x_q^{(m_r)}(i) \quad (7)$$

$$= \sum_{k=1}^{K}\sum_{n_t=1}^{N_t}\sum_{p=1}^{L}\sum_{l=1}^{L} \alpha_{q,l}^{(m_r,n_t)} d_{k,p}^{(n_t)}(i) c_{q,l}^H t_{k,p} + \tilde{n}_q^{(m_r)}(i)$$

wherein $c_{q,l}=c_q\odot W_{q,l}^*$ is the despreading vector multiplies the phase shift vector of the $l_{th}$ path, and $\tilde{n}_q^{(m_r)}(i)=c_q^H n_q^{(m_r)}(i)$ means the noise. The pre-designed space-path spreading codes can effectively suppress the multiple access interference and symbol interference by using the space-path spreading codes to remove the noise, and is shown as:

$$c_{q,l}^H t_{k,p}=1, q=k, l=p$$

$$c_{q,l} t_{k,p}=0, \text{otherwise} \quad (8)$$

wherein l=1,2, . . . , L, p=1,2, . . . ,L , k=1,2, . . . ,K. Solving the equation (8) can obtain:

$$T=C(C^H C)^{-1} \quad (9)$$

$T=[t_{1,1}, \ldots ,t_{1,L}, \ldots ,t_{K,1}, \ldots ,t_{K,L}]$ is the space-path spreading codes matrix, $C=[C_1,C_2, \ldots ,C_K]$ is the "phase shift" spreading codes matrix, and $C_k=[c_{k,1},c_{k,2}, \ldots ,c_{k,L}]$ is the M×L codes matrix of the $k_{th}$ user which is used to show the valid feature wave in the path delay spreading interval. If C has a complete column rank, namely M≧KL, the suppressing effect will be greater. When M is fixed, amount of the valid user is only limited by L, and the maximum amount of valid user is:

$$K_{max} = \left\lfloor \frac{M}{L} \right\rfloor \quad (10)$$

For retaining the total transmission energy a fixed value, $t_{k,p}$ should be normalized to $\|t_{k,p}\|=1$, that:

$$c_{q,l}^H t_{k,p}=J_{q,l}\delta[q-k]\delta[l-p] \quad (11)$$

For all q, k, l and p, $J_{q,l}$ is a normalizing factor. Substituting the equation (11) into equation (7):

$$y_q^{(m_r)}(i) = \sum_{n_t=1}^{N_t}\sum_{l=1}^{L} h_{q,l}^{(m_r,n_t)} d_{q,l}^{(n_t)}(i) + \tilde{n}_q^{(m_r)}(i) \quad (12)$$

wherein $$h_{q,l}^{(m_r,n_t)} = \alpha_{q,l}^{(m_r,n_t)} J_{q,l}$$

is the effective "compound channel".

After processing by the matched filter 20, equation (12) can be explained as an equivalent narrow-band MIMO system, which has $LN_t$ inputs ($N_t$ continuous symbols) and $M_r$ outputs (behind the matched filter 20). A flat decay channel inside it has the decay gain $$h_{q,l}^{(m_r,n_t)}$$

and the additional noise. A continuous $N_t$ symbols $y_q^{(m_r)}(i+n_t-1)$, whose $$y_{q,n_t}^{(m_r)}(i) = y_q^{(m_r)}(i+n_t-1)$$

and $m_r=1,2,\ldots,M_r$, $n_t=1,2,\ldots,N_t$, is shown in vector form:

$$y_q(i) = [y_{q,1}^{(1)}(i),\ldots,y_{q,N_t}^{(1)}(i), y_{q,1}^{(2)}(i),\ldots,y_{q,N_t}^{(2)}(i),\ldots, \quad (13)$$
$$y_{q,1}^{(M_r)}(i),\ldots,y_{q,N_t}^{(M_r)}(i)]^T$$
$$= H_q d_q(i) + \tilde{n}_q(i)$$

wherein $d_q(i) = [d_{q,1}^{(1)}(i),\ldots,d_{q,1}^{(N_t)}(i),\ldots,d_{q,L}^{(1)}(i),\ldots,d_{q,L}^{(N_t)}(i)]^T$, $\tilde{n}_q(i)$ is the noise vector, and the compound channel matrix $H_q$ of the $q_{th}$ mobile station is:

$$H_q = \begin{bmatrix} H_{q,1}^{(1)} & \cdots & H_{q,L}^{(1)} \\ \vdots & \ddots & \vdots \\ H_{q,1}^{(M_r)} & \cdots & H_{q,L}^{(M_r)} \end{bmatrix} \quad (14)$$

$$H_{q,l}^{(m_r)}$$

is the $N_r \times N_t$ sub matrix of $H_q$, $H_q$ has the complete column rank when $L \leq M_r$. The BLAST detector 24 can be applied, for example: when $N_t=2$ $$H_{q,l}^{(m_r)} = \begin{bmatrix} h_{q,l}^{(m_r,1)} & h_{q,l}^{(m_r,2)} \\ h_{q,l}^{(m_r,2)} & -h_{q,l}^{(m_r,1)} \end{bmatrix} \quad (15)$$

which has a channel structure similar to that of STBC. With the compound channel, a BLAST detector 24 can be used in a $N_t$ symbol cycle to decode $LN_t$ substreams, and a multiple gain L is obtained. On the other hand, the transmission diversity gain can be achieved with multiple transmit antennas transmitting the same $N_t$ symbols.

With assistance of linearly combining $Y_q(i)$ and the compound channel matrix $H_q$, the adequate statistics vector $Z_q(i)$ with $LN_t$ dimensions can be obtained as:

$$z_q(i) = Re\{H_q^H y_q(i)\} = F_q d_q(i) + Re\{H_q^H \tilde{n}_q(i)\} \quad (16)$$

wherein $F_q = Re\{H_q^H H_q\}$ is a $LN_t \times LN_t$ matrix, a $N_t \times N_t$ diagonal matrix $\rho_{q,l} I_{N_t}$ locates on its $l_{th}$ diagonal block, $l=1,2,\ldots,L$, and $$\rho_{q,l} = \sum_{m_r=1}^{M_r} \sum_{n_t=1}^{N_t} |h_{q,k}^{(m_r,n_t)}|^2 \quad (17)$$

shows $N_t M_r$ total diversity gain ($N_t$ comes from the transmitter, $M_r$ comes from the receiver). In view of the equation (16), this system can have $LN_t$ inputs, $LN_t$ outputs and a MIMO flat decay channel. Hence, the $LN_t$ substreams can be detected by using the method of combining MMSE and OSIC when processing the BLAST (please refer to the journal published by Foschini in IEEE J. Select. Areas Commun, November 1999, vol. 17, no. 11, page 1841-1852).

Figure 2:
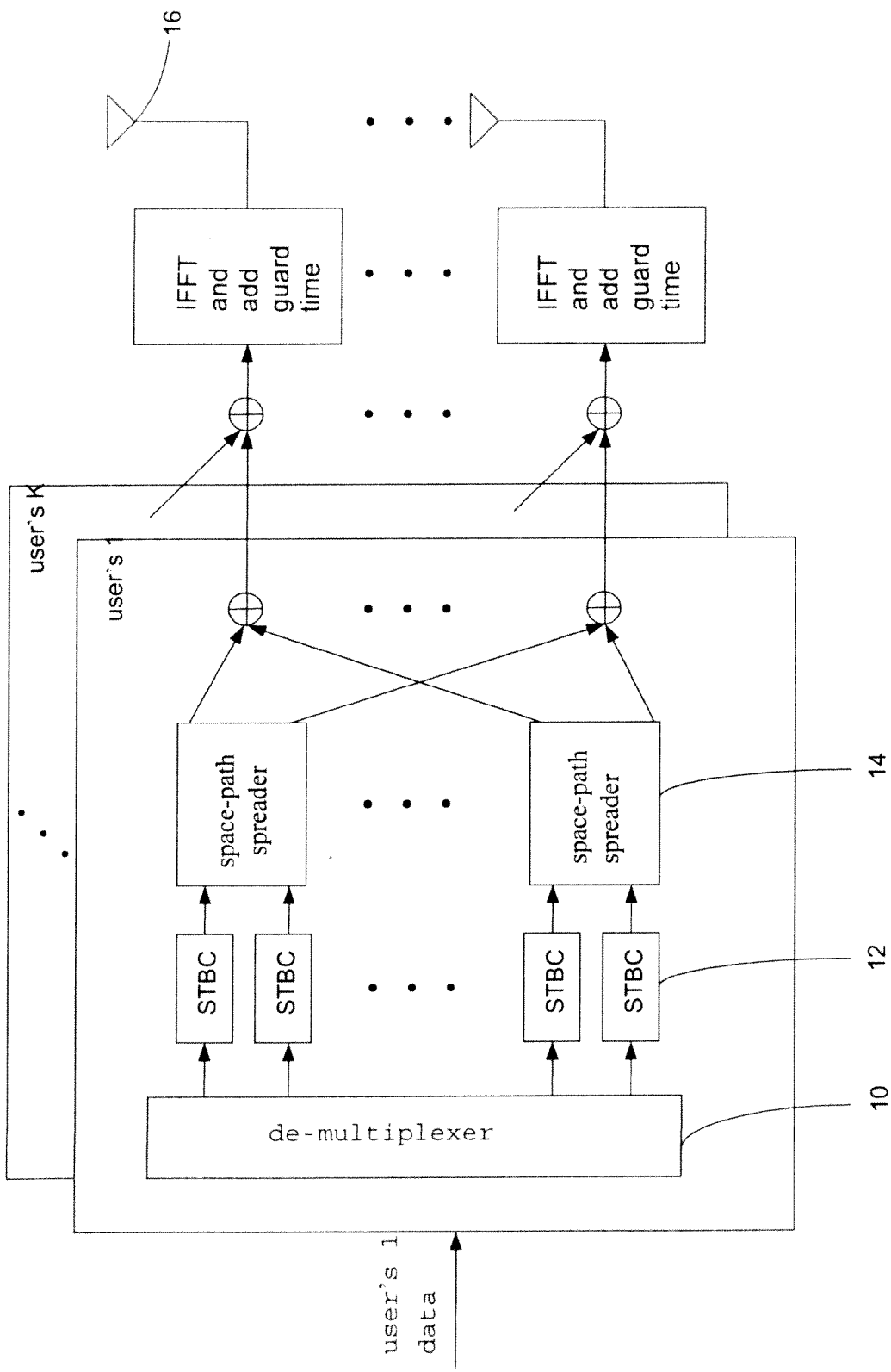
FIG. 2 is a schematic diagram of another embodiment of a MC-CDMA system according to the present invention.
Figure 3:
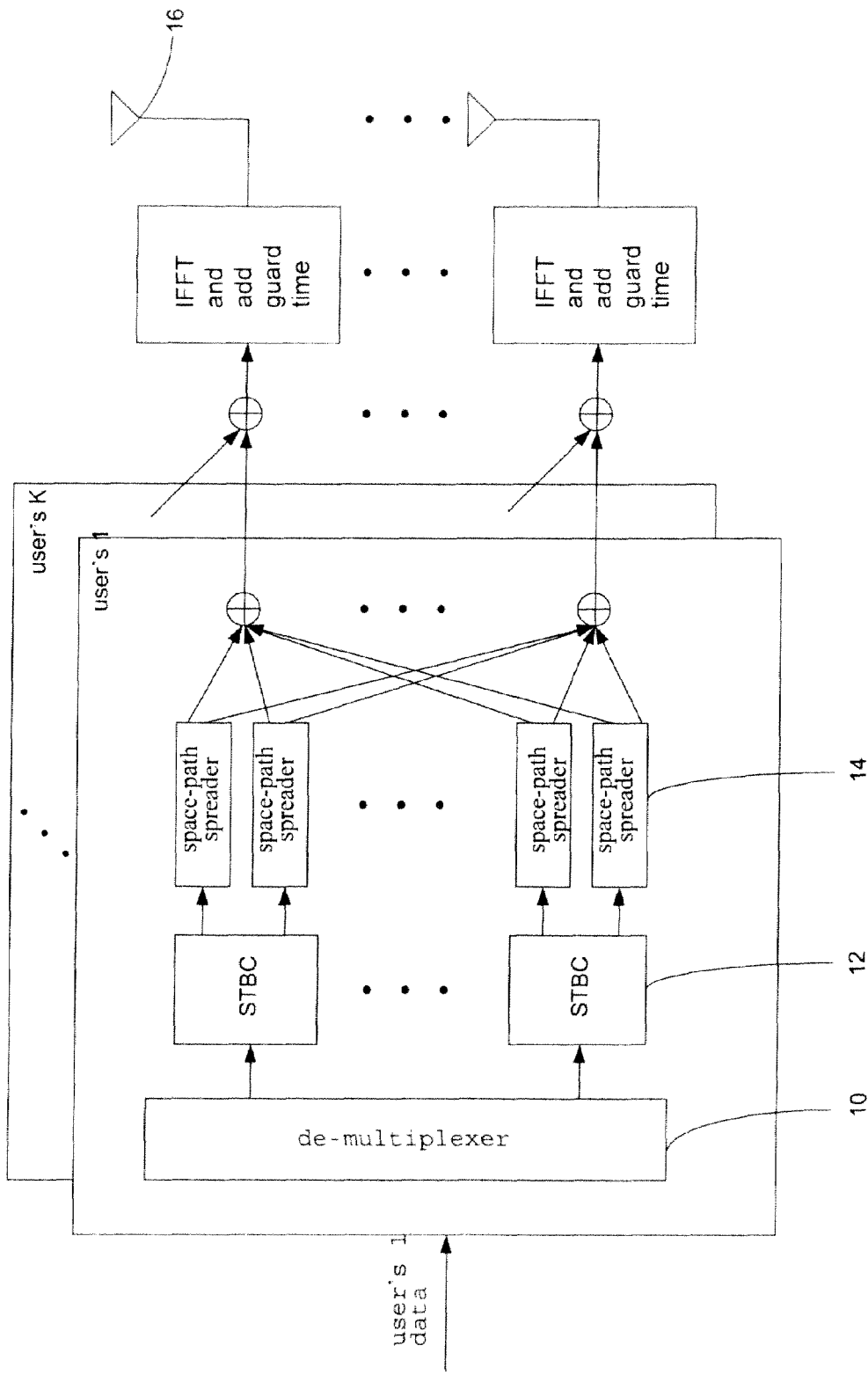
FIG. 3 is a schematic diagram of a further embodiment of a MC-CDMA system according to the present invention.

Under the structure of FIGS. 1(a) and 1(b), the total diversity gain of the MC-CDMA communication system is $N_t M_r$, and when $L \leq M_r$, the transmission speed is L (namely multiple gain) and this system can further adjust the multiple gain and the total diversity gain. Please refer to FIG. 2, in this embodiment, the substreams with STBC processed are transmitted to the corresponding space-time spreader with two substreams in one group. When $L \leq M_r/2$, the total diversity gain of this system is $N_t M_r/2$, and the transmission speed is 2L. Under the structure of FIG. 3, the outputted data of each STBC is transmitted to two space-time spreaders. When $L \leq 2M_r$, the total diversity gain of this system is $2N_t M_r$, and the transmission speed is L/2. Similarly, by adjusting the relationship of the STBC and the space-time spreader, the different diversity gains and transmission speeds are obtained. Hence, the MC-CDMA communication system of the present invention can be suitably selected in space multi-work or variance according to the requirement.

In contrast to the prior art, the present invention discloses a space time block coding technology combined with the suitable space-path spreading codes, so that the MIMO MC-CDMA communication system can have better ability of space multi-work and space variance to accomplish a greater spectrum efficiency and chain quality. In addition, the spectrum efficiency and the chain quality can be further adjusted according to actual requirements, and not only improves the system efficiency but also provides various applications.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A structure of a multi-input multi-output multicarrier code division multiple access (MIMO MC-CDMA) communication system comprising at least one transmitter and at least one receiver, the transmitter comprising:
 a de-multiplexer for receiving a user's data and outputting the data divided into a plurality of parallel data streams;
 a plurality of space time block encoders individually receiving the parallel data streams of the de-multiplexer and outputting the data streams after encoding;

a plurality of space-path spreaders, at least one of said plurality of space-path spreaders individually receiving outputted data from at least one of said plurality of space time block encoders and outputting received data after spreading with different and orthogonal space-path spreading codes pre-designed to pre-suppress multiple access interference (MAI) and to pre-equalize multiple paths in the communication system, wherein a number of said at least one space-path spreaders in relationship to a number of said at least one space time block encoders is selected to adjust a diversity gain and transmission speed in said communication system; and a plurality of transmit antennas, each transmit antenna receiving outputted data from each said at least one space-path spreader and transmitting received data through the multiple paths.

2. The structure of the communication system of claim 1, wherein the de-multiplexer receives sets of the user's data, each user's data is proceeded with the de-multiplexer, the space time block encoders and the space-path spreaders, and sets of the proceeded user's data are collected at the transmit antennas and transmitted with the transmit antennas.

3. The structure of the communication system of claim 2, wherein the structure comprises a plurality of groups composed of the de-multiplexer, the space time block encoders and the space-path spreaders, each group is used for individually proceeding one of the sets of the user's data, and sets of the proceeded user's data are collected at the transmit antennas and transmitted with the transmit antennas.

4. The structure of the communication system of claim 1, wherein the data transferred to the transmit antennas is first transformed to a time domain data with inverse fast Fourier transform (IFFT) and a guard time is added.

5. The structure of the communication system of claim 1, wherein the communication system is a wireless transceiver system.

6. The structure of the communication system of claim 5, wherein the transmitter is one of a base station.

7. The structure of the communication system of claim 1, wherein the receiver comprises:
  a plurality of receive antennas for receiving data transmitted by the transmit antennas;
  a plurality of matched filters individually receiving data received by the receive antennas and despreading it in accordance with the space-path spreading code;
  a space-time linear combiner receiving data dispread by the matched filters and outputting received data after combining;
  a BLAST detector receiving data output by the space-time linear combiner, separating mutually interfering signals from the multiple transmit antennas, obtaining diversity gain, and outputting operated data; and
  a multiplexer receiving data outputted by the BLAST detector and outputting data after multiplexing.

8. The structure of the communication system of claim 7, wherein data received by the receive antennas is transferred to the matched filters after taking fast Fourier transform (FFT) and removing guard time of data.

9. The structure of the communication system of claim 1, wherein the receiver is a mobile station of a wireless communication system.

10. The structure of the communication system of claim 7, wherein the receiver can only receive data matched by the space-path spreading code of the receiver.

11. The structure of the communication system of claim 1, wherein the space time block encoder is connected to the space-path spreader by group.

12. The structure of the communication system of claim 1, wherein each space time block encoder is connected to more than one space-path spreader.

13. A multi-input multi-output multicarrier code division multiple access (MIMO MC-CDMA) communication method comprising a step of transmitting data and a step of receiving data, the step of transmitting data comprising:
  simultaneously transferring transmitting data to a plurality of parallel data streams;
  space time block encoding each parallel data stream in a respective at least one space time block encoder;
  coupling at least one space-path spreader to said at least one space time block encoder;
  selecting a number of said at least one space-path spreaders in relationship to a number of said at least one space time block encoders to adjust a diversity gain and transmission speed in said communication systems;
  spreading the encoded data streams in said at least one space-path spreader with a different and orthogonal space-path spreading codes pre-designed to pre-suppress multiple access interference (MAI) and to pre-equalize multiple paths in the communication system; and
  collecting the spread parallel data streams, transferring to a plurality of transmit antennas, and transmitting data with the transmit antennas through multiple paths.

14. The communication method of claim 13, wherein the transmitting data comes from a plurality of users.

15. The communication method of claim 13, wherein the transmitting data is sorted by different users and transferred to the parallel data streams of different groups, and data of all parallel data streams is collected to transmit out with the transmit antennas through the multiple paths after space time block encoding and spreading with the pre-designed space-path spreading code.

16. The communication method of claim 13, steps of receiving data comprising:
  receiving data transmitted by the transmit antennas through a plurality of receive antennas;
  despreading data received by the receive antennas through a plurality of corresponding matched filters in accordance with the pre-designed space-path spreading code;
  combining the dispread data with a linear combiner; and
  separating mutually interfering signals from the combined data with a BLAST detector, and outputting data after multiplexing it with a multiplexer.

* * * * *